Patented Feb. 12, 1946

2,394,902

UNITED STATES PATENT OFFICE 2,394,902

PREPARATION OF SUBSTITUTED SULPHONAMIDES

Max Engelmann, Wilmington, Del., assignor to E. I. du Pont de Nemours & Company, Wilmington, Del., a corporation of Delaware No Drawing. Application October 3, 1942, Serial No. 460,714

11 Claims. (Cl. 260—556)

This invention pertains to hydrocarbon sulphon-N-chloramides and, more particularly to aliphatic sulphon-N-chloramides. More particularly, it pertains to open chain and cyclic aliphatic sulphon-N-chloramides and their preparation. Still more particularly it pertains to open chain and cyclic saturated aliphatic sulphon-N-chloramides in which all or part of the replaceable hydrogens on the amido nitrogen atom have been substituted and to their preparation and use.

This invention has for an object to provide a new class of hydrocarbon sulphonchloramides. A further object is to provide a new class of saturated aliphatic, including open chain and cyclic aliphatic -N-chlorsulphonamides. A still further object is to provide a new use for saturated aliphatic primary and secondary sulphonamides. A still further object is to provide a new class of bleaching agents. Another object is to provide a commercially practical method of making aliphatic -N-chlorsulphonamides. Yet another object is to provide a new class of washing and bleaching compounds and compositions. Still other objects will be apparent from the following description of the invention.

The above objects are accomplished in accordance with the invention by reacting a hydrocarbon sulphonamide having at least one reactive hydrogen atom on an amido nitrogen atom in an aqueous medium with free chlorine, or an agent liberating free chlorine under acid conditions. An aliphatic open chain or cyclic aliphatic mono- or poly-sulphonamide, for instance, may be suspended or dissolved in an aqueous medium and treated with chlorine and the -N-chlor-sulphonamide recovered. This may be done by separation and washing if it is insoluble in the aqueous solution. If the product is water soluble it may be recovered by evaporation to dryness after neutralization of the free acid present with an alkali, and extraction with a suitable solvent.

In carrying out the invention in accordance with a preferred aspect, an aliphatic or cyclo-aliphatic sulphonamide having at least one free hydrogen atom attached to amido nitrogen is dissolved or suspended in water and gaseous chlorine is slowly bubbled into the solution or suspension. The chlorine reacts rapidly with the amide group and replaces one or more of the replaceable hydrogen atoms attached thereto. The reaction is quite rapid and is exothermic. When it is essentially complete the greenish-yellow color of chlorine persists throughout the solution or suspension. If the resulting sulphon-N-chloramide is insoluble in water, it can be recovered by filtering or separation of layers and then washing free of hydrochloric acid. If it is water soluble, the solution may be evaporated to dryness after neutralizing the free acid and treated as described above.

In some cases it is desirable to keep the hydrochloric acid content low and this may be accomplished by adding an acid binding agent such as sodium or potassium bicarbonate during the course of the reaction. The concentration, however, can be kept low by diluting the reaction with water at intervals or continuously, or by starting with a dilute solution.

It is important that all ammonium chloride be removed from the hydrocarbon sulphonamide reactants because ammonium chloride reacts with an excess of chlorine to form the highly unstable and violently explosive nitrogen trichloride.

The invention will be further illustrated, but is not intended to be limited, by the following examples, wherein the parts stated are parts by weight:

*Example I.*—A mixture of butane monosulphonamides was prepared by passing a gaseous mixture of sulphur dioxide and chlorine, the former being in slight molecular excess, through a solution of butane in $CCl_4$ at $-5°$ C. while irradiating with actinic light from a 150 watt projector flood lamp, until approximately half of the butane had been reacted. The $CCl_4$ was removed from the reaction mass under vacuum. The resultant mixture of butane sulphonyl chlorides was distilled under vacuum and the distillate was composed of a mixture of butane-1 and butane-2 sulphonyl chlorides. The butane monosulphonyl chlorides were dropped into liquid ammonia, the excess liquid ammonia evaporated off and the ammonium chloride separated from the butanesulphonamides by filtration. The residual ammonium chloride in the sulphonamide may be removed by washing with a saturated salt (NaCl) solution or by distillation. Fifteen parts of this mixture of butane sulphonamides was dissolved in 60 parts of distilled water at room temperature. A slow stream of chlorine gas was passed into this solution and a viscous oil separated from the acid solution and settled to the bottom. The oil was butane monosulphondichloramide. It was readily soluble in sodium carbonate or sodium hydroxide solution and exhibited a very good bleaching action on raw cotton and fugitive dyes.

*Example II.*—Thirty parts of propane 1:3 disulphonamide was suspended in 3000 parts of distilled water at room temperature. Chlorine gas was passed into the suspension while stirring until a permanent greenish-yellow color persisted in the water. The white crystalline solid which formed was filtered off, washed several times with ice water, and dried in a desiccator under vacuum. A sample of the dried propane 1:3 disulphonetetrachloramide was recrystallized from carbon tetrachloride and melted at 45–46° C. A yield of 40 g. was obtained after drying in a desiccator under vacuum. An analysis showed 40.8% available chlorine. The theoretical available chlorine would be 41.8%. This is sufficient proof of the identity of the product since propane 1:3 disulphonamide which is a known product melting at 174° C. was used as a starting material.

*Example III.*—One part of propane 1:3 disulphonamide was dissolved in 1000 parts of distilled water at room temperature and a slow stream of chlorine gas was passed into it. A water insoluble crystalline product was formed which was filtered off and weighed 1.26 parts. This product was propane 1:3 disulphonetetrachloramide as determined by melting point.

*Example IV.*—Four hundred parts of propane 1:3 disulphonamide was divided into two equal portions and each portion was suspended in 4000 parts of distilled water in a flask provided with a stirrer. Gaseous chlorine was passed into each flask while stirring and maintaining the temperature at 15–20° C. After about 25 minutes, practically all of the propane disulphonamide, which is quite insoluble in water, had gone into solution. During the next 25 minutes a white solid was thrown out of solution in increasing quantities and the aqueous phase took on a permanent greenish-yellow coloration. The flow of chlorine was then reduced to a very slow rate and continued for one hour longer. At the end of this time, 299 parts of chlorine had been passed into one flask and 310 parts of chlorine had been passed into the other. The mixtures were stirred for one hour longer and then filtered. Each filter cake was washed with 4000 parts of cold water. The washed filter cakes were then combined and stirred with 3000 parts of cold water for several hours and allowed to stand overnight. The mixture was then filtered again, washed with 4000 parts of water, and sucked as dry as possible on a Buchner funnel. The filter cake was spread out to be air dried, during which time it was pulverized with a pestle. After drying overnight, a smooth dry powder weighing 541 parts was obtained. Analysis showed the available chlorine to be 41.7%. The theoretical available chlorine for propane 1:3 disulphontetrachloramide is 41.8%.

If a water soluble chloramide is desired, the addition of chlorine may be stopped when practically all of the propane 1:3 disulphonamide has dissolved, the solution made neutral with sodium carbonate, and filtered. The solution may be used as such or the sulphonchloramide, which is probably propane 1:3 disulphondichloramide, may be recovered by evaporating to dryness.

*Example V.*—Forty parts of a mixture of butane monosulphonamides prepared as in Example I was dissolved in 4000 parts of distilled water at room temperature and chlorine gas was passed in until a greenish-yellow color persisted. An insoluble oil formed during this time. The mixture was put into a separatory funnel and the lower oil layer was separated. The oil was left in a vacuum desiccator over sodium hydroxide pellets overnight. The weight of the oil was 66 parts and it analyzed 33.75% available chlorine. The theoretical available chlorine for butane monosulphondichloramide is 34.45%.

*Example VI.*—Twenty-seven parts of a mixture of monosulphonamide prepared as in Example I was dissolved in 200 parts of water with 34 parts of sodium bicarbonate. Chlorine gas was passed slowly into the solution until a greenish-yellow chlorine color persisted. The insoluble oil which formed was separated and dried as in Example V and weighed 38 parts. This is a yield of 93% of theory. The product analyzed 34.2% available chlorine showing it to be butane monosulphondichloramide.

*Example VII.*—One hundred and thirty-six parts of a mixture of N-methyl butane monosulphonamides prepared as in Example I, substituting monomethylamine for the ammonia, was suspended in 2000 parts of water and a stream of gaseous chlorine was passed in at 10–15° C. while stirring until the greenish-yellow color of chlorine persisted. The insoluble oil which was formed was separated and washed with four times its volume of water and was dried in a vacuum desiccator over sodium hydroxide. One hundred and forty-five parts of a pale yellow oil was obtained. The product was quite insoluble in 2N-sodium hydroxide. Analysis showed 18.45% available chlorine, indicating it was N-methyl butane monosulphon monochloramide since the theoretical amount of chlorine is 18.9%.

*Example VIII.*—One hundred and twenty-nine parts of N,N'-dimethyl propane 1:3 disulphonamide was suspended in 2000 parts of water and a stream of gaseous chlorine was passed in at 10–15° C. until no more was taken up. A white solid separated which was filtered off. After washing with water and then drying for several days in a vacuum desiccator, 163 parts of a white powder was obtained. Analysis showed 22.22% chlorine. Theory for propane 1:3 disulphon dichlordimethylamide is 23.58% chlorine, showing it to be approximately 94% pure.

*Example IX.*—Fifty parts of cyclohexane 1:4 disulphonamide was suspended in 1000 parts of water. One hundred and fifty parts of chlorine was passed into the mixture as a gaseous stream over a period of two hours at 15–20° C. Most of the chlorine was passed in during the first hour and just a small flow during the second hour. After the first hour, a greenish-yellow color persisted throughout the mass. The white solid which was formed was filtered on a Buchner funnel and washed with 1000 parts of cold water. The fine white precipitate was sucked as dry as possible and then dried in a vacuum oven at 60° C. overnight. A yield of 83 parts was obtained which analyzed 36.24% available chlorine. The theoretical available chlorine for cyclohexane 1:4 disulphontetrachloramide is 37.4%, indicating that that product was formed. The product softens at 140° C. and decomposes at 170° C.

*Example X.*—A paraffin wax tetrasulphonamide was prepared as follows: Three hundred parts of a fully refined paraffin wax averaging 24 carbon atoms in the molecule were dissolved in 960 parts of carbon tetrachloride and treated with a gaseous mixture of 667 parts of sulphur dioxide and 543 parts of chlorine at a temperature of 25–30° C. over a period of five hours under the influence of actinic light derived from a 150 watt General Electric projector flood lamp. To this reaction mass was added 160 parts of benzene. One-half of the resulting mixture (855 parts) was taken and allowed to stand overnight. A benzene layer separated on top and was decanted. The remainder of the mass was dropped into 1200 parts of liquid ammonia at −43 to −34° C. over a period of 80 minutes while stirring. The mixture was then stirred while the excess liquid ammonia evaporated. The residue was stirred vigorously with 2000 parts of hot water. After standing the paraffin wax tetrasulphonamide settled as a bottom layer and the upper layer of water containing most of the ammonium chloride was decanted.

Thirty-six parts of the paraffin wax tetrasulphonamide so prepared was suspended in 200 parts of water. To this suspension was added 20 parts of a 30% sodium hydroxide solution. A clear aqueous solution resulted. Chlorine was passed into this solution until an acid reaction was obtained. An insoluble tacky mass separated out of solution. After cooling with ice, the supernatant liquid was decanted and the tacky solid was solidified by the addition of solid ice to it. It was then washed several times with ice water. After drying overnight in a vacuum desiccator over sodium hydroxide pellets, a white solid mass was obtained which was very friable and broke up readily into a fine white powder. The product in aqueous solution liberated iodine from potassium iodide solution. Analysis showed the presence of 5.3% available chlorine, which is an average of approximately one atom of available chlorine per molecule. If, instead of stopping the flow of chlorine after the solution becomes acid, the flow is continued, a product containing a higher percentage of available chlorine may be obtained.

*Example XI.*—Five parts of butane 1:4 disulphonamide was suspended in 250 parts of water at 25° C. and gaseous chlorine was bubbled into the suspension until a greenish-yellow color persisted. White crystals of butane 1:4 disulphontetrachloramide precipitated. The crystals were filtered off, washed free of acid with water and dried. Analysis showed 37.5% active chlorine. The crystals melted at 141–143° C. after recrystallization from acetone.

The reaction may be carried out over a fairly wide temperature range, a practical range being from 0 to 50° C. The preferred temperature range is approximately 10 to 30° C. The reaction requires one mol of chlorine per amide hydrogen atom replaced. Thus one mol of hydrogen chloride and one mol of chloramide is formed. While this is the theoretical chlorine consumption the actual consumption in practice will always be greater due to the fact that it is seldom possible to obtain complete utilization of a gas in this type of procedure. The actual consumption of chlorine will be influenced by the rate of addition, the efficiency of the distribution of the gas in the aqueous solution, and the depth of the liquid through which the chlorine would rise. The appearance of the characteristic greenish-yellow chlorine color in the atmosphere above the aqueous phase while the latter remains colorless is an indication that chlorine is being introduced into the system too fast for complete utilization.

The sulphonchloramides may be prepared in other ways than those cited in the examples. Instead of chlorine there may be used other chlorinating agents yielding nascent chlorine, e. g., sodium hypochlorite or calcium hypochlorite in the presence of an acid. The preferred method involves the use of chlorine gas. The reaction may be carried out in an acid, alkaline or neutral medium but the recovery should be done under acid conditions. Thus, a normally water insoluble sulphonamide may be dissolved in an alkali such as sodium hydroxide, or sodium carbonate to form a clear solution. When chlorine is passed through this solution until the solution becomes acid, the sulphonchloramide will precipitate out. On the other hand, the excess free hydrochloric acid generated by the process may be constantly neutralized during the procedure by the addition of proper quantity of an alkaline reacting agent such as sodium hydroxide or an acid neutralizing agent such as sodium bicarbonate. The reaction takes place readily in the presence of free hydrochloric acid. A high concentration of free hydrochloric acid is not particularly desirable since it apparently causes a decrease in the yield of the sulphonchloramide. This may be due to the fact that the sulphonchloramide is reduced by large excess of the hydrochloric acid after it has been formed. The presence of free acid at the end of the reaction is essential for separation of the sulphonchloramide. Additional suitable acids which may be present during the process steps include aqueous sulphuric, phosphoric, and acetic acids. In general, the acidity should be maintained less than 10%.

The hydrocarbon sulphonamides used may contain a number of sulphonamide groups per molecule, e. g., 1, 2, 3, 4, 5, 6 or more. Products of the general formula $R—(SO_2NaCl)_n$ wherein R is an aliphatic or cycloaliphatic hydrocarbon radical, A chlorine or a hydrocarbon radical, and $n$ an integer, e. g., 1 to 6 or more would thus be formed.

This invention is obviously not limited to the treatment of the particular sulphonamides given in the specific examples. On the contrary, it is applicable to any aliphatic or cycloaliphatic mono- or polysulphonamide having at least one replaceable hydrogen atom on an amido nitrogen atom. Suitable additional hydrocarbon sulphonamides include cyclohexane sulphonamide, N-methyl cyclohexane sulphonamide, pentane sulphonamide, octane sulphonamide, dodecane sulphonamide, and hexadecane sulphonamide. Mixtures of sulphonamides are also suitable including those obtainable by amidation of the hydrocarbon sulphonyl chlorides obtained by reacting a hydrocarbon with admixed sulphur dioxide and chlorine in substantially equimolecular proportions while irradiating the reaction zone with actinic light, e. g., light containing wave lengths from 1800 to 7600 Å units. Suitable hydrocarbons and the preparation of suitable hydrocarbon sulphonyl chlorides are described in United States patents, 2,174,492, 2,174,506, 2,174,-507, 2,174,508, 2,174,509, 2,197,800, 2,212,786, and 2,265,312. The general process underlying the aforegoing group of patents constitutes a very economical process for preparing the respective compounds but is limited in its application to saturated aliphatic and cycloaliphatic compounds; therefore, the corresponding saturated sulphonamides constitute the preferred initial materials for the purpose of this invention.

The sulphonamides can be prepared by reacting hydrocarbon sulphonyl chlorides with liquid ammonia. For instance, butane sulphonyl chloride may be converted into butane monosulphonamide by dropping it slowly into liquid ammonia and recovering the sulphonamide. Similarly, propane 1:3 disulphonyl chloride can be converted into a disulphonamide by slowly dropping propane 1:3 disulphonyl chloride into liquid ammonia. The disulphonamide thus formed is soluble in hot water but insoluble in cold water.

The sulphonamides obtainable from hydrocarbon sulphonyl chlorides from petroleum fractions, e. g., ranging from light kerosene fractions to paraffin waxes in the manner set forth in Reed Reissue 20,968 and the other patents listed above, are useful sources of materials for the present invention. Various procedures for preparing sulphonamides are described in Fox application Serial No. 246,903, filed December 20, 1938 (Patent No. 2,334,186, issued November 16, 1943). Other suitable sulphonamides and sulphonyl chlorides useful for preparing them are described in United States patents, 2,142,934, 2,146,744, 2,147,346, 2,265,163, 2,174,856, and 2,277,325.

Sulphonamides prepared from the sulphonyl chlorides obtainable from kerosene fractions, gas oil fractions, paraffin wax, etc., form useful reactants because of the availability of the inexpensive raw materials. The nitrogen atom of the sulphonamides of these and any of the above sulphonamides may be substituted by not more than one alkyl or substituted alkyl group. In addition to the N-methyl compounds of Examples VII and VIII, the alkyl substituent may be ethyl, butyl, dodecyl, cetyl, chlorocetyl, etc.

The products of this invention are unique in many ways. They have many of the characteristics of the inorganic hypochlorites in that they are bleaching agents, oxidizing agents, chlorinating agents, etc. The per cent of available chlorine is favorably high, particularly in the tetrachlor disulphonamides. Thus, propane disulphontetrachloramide contains 41.8% available chlorine. Some of these products are clear viscous oils and other crystalline solids. Some are only very slightly soluble in water and others are rather soluble in water. Aqueous solutions or suspensions of these materials have bleaching properties. These products are soluble in many organic solvents, particularly in hydrocarbons, e. g., benzene, toluene, xylene, benzine, petroleum ether, pentane, hexane, etc., and chlorinated solvents, e. g., carbon tetrachloride, chloroform, trichlorethylene, dichlorethane, etc. Consequently, it is possible to obtain chlorinating and bleaching properties in non-aqueous systems. The processes of this invention provide a means for obtaining organic compounds containing available chlorine and which are soluble in water or solvents to a limited or large extent depending on the starting materials. Compounds can thus be obtained to satisfy many diverse requirements.

These products have numerous and varied uses. Representative of such uses there may be mentioned bleaching action, for example on dyed fabrics, for the removal of residual color in the preparation of white fabrics, in the preparation of white paper, in the home or commercial laundry, for bleaching prints, etc. They may be useful as antiseptic, bectericides, fungicides, etc., where, in addition to water soluble forms, it is also possible to have solutions in organic solvents, pastes, or salves. The water insoluble sulphonchloramides offer a very convenient means for small scale water purification where water may be passed through a layer of this material and thus be chlorinated, for example, this material is much easier to transport than liquid chlorine for purifying water in small amounts such as is done in army field maneuvers. The sulphonchloramides may be dissolved in chlorinated or hydrocarbon solvents and used as a mustard gas destroying agent, this use being a very large improvement over the ordinary use of bleaching powder slurry in which the mustard gas is insoluble. Certain of the sulphonchloramides may be dissolved in suitable chlorinated solvents or hydrocarbon solvents and used in the decontamination of victims subjected to the action of mustard gas; furthermore, emollients or salves may be prepared which contain these sulphonchloramides and may be used as a protection against exposure to mustard gas vapors or liquid. These sulphonchloramides may also be used as decontaminating agents for other war gases whose effectiveness is destroyed by chlorinating action. In general, these products may be used wherever the action of nascent chlorine is required.

The sulphonchloramides obtained by the processes of this invention are rather stable substances. Most of them may be melted without decomposition and they may be recrystallized from solvents. They may be dissolved in alkalies and reprecipitated by acid to yield the same chloramide. Upon heating to temperatures appreciably above their melting points, they decompose violently. Oxygenated compounds are vigorously attacked, for example, ethyl alcohol is converted to chloroform by the action of these sulphonchloramides. Some of them react explosively with aqueous ammonium hydroxide, presumably due to the formation of very unstable and highly explosive nitrogen trichloride. In general, the solid sulphonchloramides are non-hygroscopic and form free flowing dry powders, many of which acquire an electrostatic charge very readily.

As many apparently widely different embodiments of this invention may be made without departing from the spirit and scope thereof, it is to be understood that the invention is not limited to the specific embodiments thereof except as defined in the appended claims.

I claim:

1. A hydrocarbon sulphon-N-chloramide of the general formula: $R-(SO_2NYCl)_n$ wherein R is a saturated hydrocarbon radical selected from the group consisting of saturated aliphatic and cycloaliphatic hydrocarbon radicals, Y is a member of the group consisting of chlorine and saturated aliphatic hydrocarbon radicals and $n$ is an integer.

2. A hydrocarbon sulphon-N-chloramide wherein the hydrocarbon radical attached to the $-SO_2-$ group is taken from the group consisting of saturated aliphatic and cycloaliphatic radicals.

3. A saturated open-chain aliphatic polysulphonchloramide containing at least one chlorine atom attached to an amino nitrogen atom.

4. A saturated open chain aliphatic disulphonchloramide wherein at least one chlorine atom is attached to each amido nitrogen atom.

5. The process of preparing N-chlor substituted aliphatic sulphonamides which comprises reacting an aliphatic sulphonamide containing at least one replaceable hydrogen atom on an amido nitrogen atom in aqueous solution with chlorine gas and recovering an N-chlor substituted aliphatic sulphonamide under acid conditions.

6. The process which comprises reacting a saturated aliphatic open chain polysulphamide having at least one replaceable hydrogen atom on each amido nitrogen atom with gaseous chlorine in an aqueous medium and recovering an aliphatic polysulphonchloramide under acid conditions.

7. The process which comprises reacting a saturated aliphatic disulphonamide with gaseous chlorine in an aqueous medium and recovering an aliphatic disulphonchloramide under acid conditions.

8. A bleaching composition comprising a solvent solution containing a hydrocarbon sulphon-N-chloramide of the general formula:

$$R\text{---}(SO_2NYCl)_n$$

wherein R is a saturated hydrocarbon radical selected from the group consisting of saturated aliphatic and cycloaliphatic hydrocarbon radicals, Y is a member of the group consisting of chlorine and saturated aliphatic hydrocarbon radicals and $n$ is an integer.

9. Butane-monosulphone-dichloramide.
10. Propane-1:3-disulphone-tetrachloramide.
11. Cyclohexane - 1:4 - disulphone-tetrachloramide.

MAX ENGELMANN.